United States Patent
Choi et al.

(10) Patent No.: US 10,218,002 B2
(45) Date of Patent: Feb. 26, 2019

(54) POSITIVE ELECTRODE MIX FOR SECONDARY BATTERIES INCLUDING IRREVERSIBLE ADDITIVE

(71) Applicant: LG Chem, Ltd., Seoul (KR)

(72) Inventors: Bokkyu Choi, Daejeon (KR); Seok Koo Kim, Daejeon (KR); Eun Ju Lee, Daejeon (KR); Sei Woon Oh, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 89 days.

(21) Appl. No.: 14/891,250

(22) PCT Filed: Jul. 28, 2014

(86) PCT No.: PCT/KR2014/006865
§ 371 (c)(1),
(2) Date: Nov. 13, 2015

(87) PCT Pub. No.: WO2015/016548
PCT Pub. Date: Feb. 5, 2015

(65) Prior Publication Data
US 2016/0133933 A1  May 12, 2016

(30) Foreign Application Priority Data
Jul. 30, 2013  (KR) .................. 10-2013-0090534

(51) Int. Cl.
| | | |
|---|---|---|
| *H01M 4/62* | (2006.01) | |
| *H01M 4/04* | (2006.01) | |
| *H01M 4/131* | (2010.01) | |
| *H01M 4/1391* | (2010.01) | |
| *H01M 4/36* | (2006.01) | |
| *H01M 4/485* | (2010.01) | |
| *H01M 4/58* | (2010.01) | |
| *H01M 4/583* | (2010.01) | |
| *H01M 10/42* | (2006.01) | |
| *H01M 4/38* | (2006.01) | |
| *H01M 10/0525* | (2010.01) | |

(52) U.S. Cl.
CPC .......... *H01M 4/62* (2013.01); *H01M 4/0404* (2013.01); *H01M 4/131* (2013.01); *H01M 4/1391* (2013.01); *H01M 4/364* (2013.01); *H01M 4/485* (2013.01); *H01M 4/583* (2013.01); *H01M 4/5815* (2013.01); *H01M 10/4235* (2013.01); *H01M 4/0447* (2013.01); *H01M 4/366* (2013.01); *H01M 4/386* (2013.01); *H01M 4/624* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2002/0026707 | A1* | 3/2002 | Yamasaki | C01G 23/005 29/623.2 |
| 2006/0251967 | A1 | 11/2006 | Goh | |
| 2008/0003503 | A1 | 1/2008 | Kawakami et al. | |
| 2011/0229763 | A1* | 9/2011 | Lu | H01M 4/505 429/220 |
| 2012/0034526 | A1 | 2/2012 | Kurahashi | |
| 2012/0217452 | A1 | 8/2012 | Park et al. | |
| 2012/0244432 | A1 | 9/2012 | Park et al. | |
| 2013/0017449 | A1 | 1/2013 | Yasuda et al. | |
| 2014/0038041 | A1 | 2/2014 | Kajiwara et al. | |
| 2014/0141224 | A1* | 5/2014 | Pasquali | C01B 31/00 428/219 |

FOREIGN PATENT DOCUMENTS

| | | |
|---|---|---|
| CN | 101615692 A | 12/2009 |
| CN | 102037601 A | 4/2011 |
| CN | 102339980 A | 2/2012 |
| JP | S63241864 A | 10/1988 |
| JP | H08148180 A | 6/1996 |
| JP | 2001-023697 A | 1/2001 |
| JP | 2001273899 A | 10/2001 |
| JP | 2004319268 A | 11/2004 |
| JP | 2006344395 A | 12/2006 |
| JP | 2008300244 A | 12/2008 |
| JP | 2010129481 A | 6/2010 |
| JP | 2011233234 A | 11/2011 |
| JP | 2011233369 A | 11/2011 |
| JP | 2011238490 A | 11/2011 |
| JP | 5093544 B2 | 12/2012 |
| JP | 2014063645 A | 4/2014 |
| KR | 10-2006-0106772 | 10/2006 |
| KR | 10-2011-0134852 | 12/2011 |
| KR | 10-2012-0122788 | 7/2012 |

(Continued)

OTHER PUBLICATIONS

Machine translation of Chinese Patent 101615692; Dec. 2009.*
Machine translation of JP 63-241864; Nov. 1988.*
Chinese Search Report for Application No. 201480027423.0 dated Dec. 26, 2016.
International Search Report for Application No. PCT/KR2014/006865 dated Nov. 4, 2014.

*Primary Examiner* — Wyatt P McConnell
(74) *Attorney, Agent, or Firm* — Lerner, David, Littenberg, Krumholz & Mentlik, LLP

(57) ABSTRACT

Disclosed is a positive electrode mix for secondary batteries including an irreversible additive. More particularly, provided is a positive electrode mix for secondary batteries including an irreversible additive that decreases irreversible efficiency of a positive electrode active material and a positive electrode.

22 Claims, No Drawings

(56) References Cited

FOREIGN PATENT DOCUMENTS

| KR | 20130003591 A | 1/2013 |
|----|---------------|--------|
| WO | 2010113268 A1 | 10/2010 |
| WO | 2012108702 A2 | 8/2012 |
| WO | 2012115411 A2 | 8/2012 |

\* cited by examiner

POSITIVE ELECTRODE MIX FOR SECONDARY BATTERIES INCLUDING IRREVERSIBLE ADDITIVE

CROSS REFERENCE TO RELATED APPLICATIONS

The present application is a national phase entry under 35 U.S.C. § 371 of International Application No. PCT/KR2014/006865, filed Jul. 28, 2014, which claims priority from Korean Patent Application No. 10-2013-0090534, filed Jul. 30, 2013, the disclosures of which are incorporated herein by reference.

TECHNICAL FIELD

The present invention related to a positive electrode mix for secondary batteries including an irreversible additive.

BACKGROUND ART

As mobile device technology continues to develop and demand therefor continues to increase, demand for secondary batteries as energy sources is rapidly increasing. Among these secondary batteries, lithium secondary batteries which exhibit high energy density and voltage, long lifespan and low self-discharge rate are commercially available and widely used.

As positive electrode active materials for such lithium secondary batteries, lithium-containing cobalt oxides such as $LiCoO_2$ are mainly used. In addition, lithium-containing manganese oxides such as $LiMn_2O_4$ having a spinel crystal structure and the like, and lithium-containing nickel oxides such as $LiNiO_2$, etc. are also used. As negative active materials, carbon-based materials are mainly used and use of lithium metal, sulfur compounds, etc. is also considered. In particular, since a theoretical specific capacity of pure silicon (Si) is 4200 mAh/g, which is dramatically higher than that of graphite carbon at 372 mAh/g, lithium secondary batteries using Si-based active materials attract great interest. In some cases, Si-based active materials mixed with carbon materials are used as an electrode.

However, when irreversible efficiency of negative electrodes is lower than positive electrodes, negative electrode active materials are added in excessively large amounts, negatively affecting battery energy density. In addition, in order to adjust irreversible capacities of negative electrodes, positive electrode active materials also should be added in excessively large amounts to correspond to the irreversible capacities of the negative electrodes.

Therefore, there is an urgent need for technology to resolve such problems.

DISCLOSURE

Technical Problem

Therefore, the present invention has been made to solve the above and other technical problems that have yet to be resolved.

As a result of a variety of extensive and intensive studies and experiments, the inventors of the present invention confirmed that, when a positive electrode mix for secondary batteries includes an irreversible additive that decreases irreversible efficiency of a positive electrode, irreversible efficiency may be effectively designed, and, in some cases, a conductive network composition of the electrode may be improved due to high conductivity, as described below, thus completing the present invention.

Technical Solution

In accordance with one aspect of the present invention, provided is a positive electrode mix for secondary batteries including an irreversible additive that decreases irreversible efficiency of a positive electrode active material and a positive electrode.

In a specific embodiment, the irreversible additive may have an operation voltage of 1.0 V to 2.5 V with respect to Li.

Accordingly, since an operation voltage of the irreversible additive is generally lower than that of a positive electrode which is 2.5 to 4.25 V, the irreversible additive participates in reaction only during initial charge and does not participate in reaction during discharge. Accordingly, irreversible efficiency of a battery may be effectively designed.

In addition, since the irreversible additive may exhibit high conductivity in some cases, a conductive network composition of the electrode may be improved.

In this case, an electric resistance value of the irreversible additive may be 5 μΩm to 100 μΩm.

In a specific embodiment, the irreversible additive may be a lithiated lithium titanium oxide represented by $Li_{7/3}Ti_{5/3}O_4$.

In another specific embodiment, the irreversible additive may be a lithium molybdenum compound, more particularly, lithium molybdenum sulfide represented by Formula 1 below.

$$Li_{2+x}Mo_{6-y}M_yS_{8-z} \quad (1),$$

wherein, $-0.1 \le x \le 0.5$, $0 \le y \le 0.5$, and $-0.1 \le z \le 0.5$, and

M is a metal or transition metal cation having an oxidation number of +2 to +4.

In this case, the lithium molybdenum sulfide may be $Li_{2.3}Mo_6S_{7.7}$.

Meanwhile, the irreversible additive may be included in an amount of 0.1 wt % to 5 wt % with respect to the total weight of the positive electrode mix.

Meanwhile, the positive electrode active material may include a lithium transition metal oxide represented by Formula 2 or 3 below.

$$Li_xM_yMn_{2-y}O_{4-z}A_z \quad (2),$$

wherein M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one monovalent or divalent anion; and $0.9 \le x \le 1.2$, $0 < y < 2$, and $0 \le z < 0.2$.

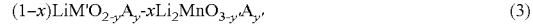
$$(1-x)LiM'O_{2-y}A_{y'}-xLi_2MnO_{3-y'}A_{y'} \quad (3)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0 < x < 1$, $0 < y \le 0.02$, $0 < y' \le 0.02$, $0.5 \le a \le 1.0$, $0 \le b \le 0.5$, and $a+b=1$.

In a specific embodiment, the positive electrode mix may further include a binder and a conductive material.

In a specific embodiment, the irreversible additive may be uniformly mixed with the positive electrode active material and coated on a positive electrode collector, or may be coated while forming a layer with the positive electrode active material.

In this case, the irreversible additive layer may be coated on a positive electrode active material layer on the positive electrode collector, and the thickness of the irreversible additive layer may be 0.1% or more and less than 20% with respect to the total thickness of the positive electrode mix layer.

In addition, the irreversible additive layer may further include a conductive material. Particularly, the conductive material is included in an amount of 20 wt % with respect to the total weight of the irreversible additive.

The present invention provides a positive electrode manufactured by coating the positive electrode mix on an electrode collector. In general, a positive electrode is prepared by drying after coating a mixture of a positive electrode active material, a conductive material and a binder, as an electrode mix, on a positive electrode current collector. In this case, as desired, the mixture may further include a filler.

Examples of the positive electrode active material may include, in addition to the lithium transition metal oxide represented by Formulas 2 or 3, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having formula $LiNi_{1-x}M_xO_2$ where M=Co, Mn, Al, Cu, Fe, Mg, B, or Ga, and $0.01 \leq x \leq 0.3$; lithium manganese composite oxides having formula $LiMn_{2-x}M_xO_2$ where M=Co, Ni, Fe, Cr, Zn, or Ta, and $0.01 \leq x \leq 0.1$ or formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % with respect to the total weight of a mixture including a positive electrode active material. Such a conductive material is not specifically limited so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

Meanwhile, the graphite-based material having elasticity may be used as a conductive material and may be used with the materials listed above.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The present invention provides a secondary battery including an electrode assembly, which includes the positive electrode, a negative electrode, and a separator disposed between the positive electrode and the negative electrode, impregnated with an electrolyte solution.

In this case, the negative electrode may include a silicon (Si)-based material as a negative electrode active material. The silicon-based material may be a complex of silicon and silicon oxide and/or a silicon alloy.

In addition, the negative electrode active material may further include a carbon-based material, and the carbon-based material may be included in an amount of 70 wt % to 99.9 wt % with respect to the total weight of the negative electrode active material. The carbon-based material may be at least one selected from the group consisting of artificial crystalline graphite, natural crystalline graphite, amorphous hard carbon, low-crystalline soft carbon, carbon black, acetylene black, Ketjen black, Super-P, graphene and fibrous carbon, particularly artificial crystalline graphite and/or natural crystalline graphite.

In a specific embodiment, the secondary battery may be a lithium ion battery, a lithium ion polymer battery or a lithium polymer battery.

In general, the lithium secondary battery includes a positive electrode, a negative electrode, a separator disposed between the positive electrode and the negative electrode, and a lithium salt-containing non-aqueous electrolyte. The other components of the lithium secondary batteries will be described below.

Examples of the negative electrode active material include, in addition to the carbon-based material and Si, metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides, etc, but the present invention is not limited thereto.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention may provide a battery module including the secondary battery as a unit cell, a battery pack including the battery module, and a device including the battery pack as a power source.

In this regard, particular examples of the device include, but are not limited to, an electric vehicle, a hybrid electric vehicle, a plug-in hybrid electric vehicle and a system for storing power.

MODE FOR INVENTION

Now, the present invention will be described in more detail with reference to the accompanying drawings. These examples are provided for illustrative purposes only and should not be construed as limiting the scope and spirit of the present invention.

Example 1

93 wt % of a lithium nickel manganese-based composite oxide including a large amount of nickel as a positive electrode active material, 3 wt % of Super-P as a conductive material, 3 wt % of PVdF as a binder and 1 wt % of a lithium molybdenum sulfide ($Li_{2.3}Mo_6S_{7.7}$) as an irreversible additive were added to N-methyl-2-pyrrolidone (NMP) as a solvent, thereby preparing a positive electrode mix. The positive electrode mix was coated on aluminum foil having a thickness of 15 μm, thereby manufacturing a positive electrode.

Example 2

94 wt % of a lithium nickel manganese-based composite oxide including a large amount of nickel as a positive electrode active material, 3 wt % of Super-P as a conductive material and 3 wt % of PVdF as a binder was added to N-methyl-2-pyrrolidone (NMP) as a solvent, thereby preparing a positive electrode mix. The positive electrode mix was coated on aluminum foil having a thickness of 15 μm and lithium molybdenum sulfide ($Li_{2.3}Mo_6S_{7.7}$) as an irreversible additive was coated to a thickness of 6 μm on a positive electrode mix layer coated on the aluminum foil, thereby manufacturing a positive electrode.

Example 3

92 wt % of a lithium nickel manganese-based composite oxide including a large amount of nickel as a positive electrode active material, 3 wt % of Super-P as a conductive material, 3 wt % of PVdF as a binder and 2 wt % of a lithium titanium oxide ($Li(Li_{1/3}Ti_{5/3})O_4$) as an irreversible additive were added to N-methyl-2-pyrrolidone (NMP) as a solvent, thereby preparing a positive electrode mix. The positive electrode mix was coated on aluminum foil having a thickness of 15 μm, thereby manufacturing a positive electrode.

Example 4

94 wt % of a lithium nickel manganese-based composite oxide including a large amount of nickel as a positive electrode active material, 3 wt % of Super-P as a conductive material and 3 wt % of PVdF as a binder was added to N-methyl-2-pyrrolidone (NMP) as a solvent, thereby preparing a positive electrode mix. The positive electrode mix was coated on aluminum foil having a thickness of 15 μm and a titanium oxide (Li(Li$_{1/3}$Ti$_{5/3}$)O$_4$) as an irreversible additive was coated to a thickness of 10 μm on a positive electrode mix layer coated on the aluminum foil, thereby manufacturing a positive electrode.

Comparative Example 1

A positive electrode was manufactured in the same manner as in Example 1 except that a lithium molybdenum sulfide (Li$_{2.3}$Mo$_6$S$_{7.7}$) or a lithium titanium oxide (Li(Li$_{1/3}$Ti$_{5/3}$)O$_4$) was not added or coating was not performed, and a positive electrode mix was prepared by adding 94 wt % of a lithium nickel manganese-based composite oxide including a large amount of nickel as a positive electrode active material, 3 wt % of Super-P as a conductive material and 3 wt % of PVdF as a binder to N-methyl-2-pyrrolidone (NMP) as a solvent.

Experimental Example 1

A negative electrode, which includes a silicon-carbon complex as a negative electrode active material, having an irreversible efficiency of 84% (charge capacity: 535 mAh/g) was manufactured. Irreversible efficiency of the positive electrode manufactured according to each of Examples 1 to 4 and Comparative Example 1, and, after manufacturing batteries including the positive electrode and the negative electrode, battery capacities measured from the batteries are summarized in Table 1.

TABLE 1

|  | Negative electrode efficiency | Positive electrode efficiency | Battery capacity |
|---|---|---|---|
| Example 1 | 84% | 90% | 1642 mAh |
| Example 2 | 84% | 89.7% | 1638 mAh |
| Example 3 | 84% | 89.8% | 1631 mAh |
| Example 4 | 84% | 90.1% | 1634 mAh |
| Comparative Example 1 | 84% | 94% | 1540 mAh |

As shown in Table 1, it can be confirmed that the irreversible efficiency differences between the positive electrode mixes including the lithium molybdenum sulfide or lithium titanium oxide as an irreversible additive and the negative electrodes in Examples 1 to 4 of the present invention are smaller than the irreversible efficiency difference between the positive electrode mix and the negative electrode according to Comparative Example 1 not including the irreversible additive. Accordingly, the battery capacities may be increased over all since the lithium as an irreversible agent of the negative electrode increases irreversibility of the positive electrode.

This occurs because the lithium molybdenum sulfide and lithium titanium oxide participate in reaction only during initial charge, and do not participate in reaction during discharge, due to the operation voltages of the lithium molybdenum sulfide and lithium titanium oxide, which are within a range of 1.0 V to 2.5 V with respect to Li, being lower than the operation voltage of the positive electrode.

Accordingly, when the lithium molybdenum sulfide or the lithium titanium oxide as an irreversible additive was added to the positive electrode mix, or additionally coated on the positive electrode mix, a total capacity and an energy density per unit volume of a battery cell may be maximized by adjusting initial irreversible efficiency of the positive electrode in a range similar to that of the negative electrode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a positive electrode mix for secondary batteries according to the present invention includes an irreversible additive that may decrease irreversible efficiency of a positive electrode active material and a positive electrode, whereby battery irreversible efficiency may be effectively designed and a conductive network composition of the electrode may be improved.

The invention claimed is:

1. A positive electrode mix for secondary batteries comprising an irreversible additive that decreases irreversible efficiency of a positive electrode active material and a positive electrode,
wherein the irreversible additive is a lithium molybdenum sulfide represented by Formula 1 below:

$$Li_{2+x}Mo_{6-y}M_yS_{8-z} \quad (1),$$

wherein −0.1≤x≤0.5, 0≤y≤0.5, −0.1≤z≤0.5, and M is a metal or transition metal cation having an oxidation number of +2 to +4, and
the irreversible additive has an operation voltage of 1.0 V to 2.5 V with respect to Li, and
wherein the positive electrode mix further comprises a positive electrode active material comprising a lithium transition metal oxide represented by Formula 2 or 3 below:

$$Li_xM_yMn_{2-y}O_{4-z}A_z \quad (2),$$

wherein in Formula 2:
M is at least one element selected from the group consisting of Al, Mg, Ni, Co, Fe, Cr, V, Ti, Cu, B, Ca, Zn, Zr, Nb, Mo, Sr, Sb, W, Ti and Bi;
A is at least one monovalent or divalent anion; and 0.9≤x≤1.2, 0<y<2, and 0≤z<0.2, $$(1-x)LiM'O_{2-y}A_y\text{-}xLi_2MnO_{3-y'}A_{y'} \quad (3),$$

wherein in Formula 3:
M' is Mn$_a$M$_b$;
M is at least one selected from the group consisting of Ni, Ti, Co, Al, Cu, Fe, Mg, B, Cr, Zr, Zn and Period II transition metals;
A is at least one selected from the group consisting of anions such as PO$_4$, BO$_3$, CO$_3$, F and NO$_3$; and 0<x<1, 0<y≤0.02, 0<y'≤0.02, 0.5≤a≤1.0, 0≤b≤0.5, and a+b=1.

2. The positive electrode mix according to claim 1, wherein the irreversible additive exhibits conductivity.

3. The positive electrode mix according to claim 2, wherein an electric resistance value of the irreversible additive is 5 μΩm to 100 μΩm.

4. The positive electrode mix according to claim 1, wherein the lithium molybdenum sulfide is $Li_{2.3}MO_6S_{7.7}$.

5. The positive electrode mix according to claim 1, wherein the irreversible additive is comprised in an amount of 0.1 wt % to 5 wt % with respect to a total weight of the positive electrode mix.

6. The positive electrode mix according to claim 1, wherein the positive electrode mix further comprises a binder and a conductive material.

7. The positive electrode mix according to claim 1, wherein the irreversible additive is uniformly mixed with the positive electrode active material and coated on a positive electrode collector.

8. The positive electrode mix according to claim 1, wherein the irreversible additive is coated while forming a layer with the positive electrode active material on a positive electrode collector.

9. The positive electrode mix according to claim 8, wherein a thickness of the irreversible additive layer is 0.1% or more and less than 20% with respect to a total thickness of a positive electrode mix layer.

10. The positive electrode mix according to claim 8, wherein the irreversible additive layer further comprises a conductive material.

11. The positive electrode mix according to claim 10, wherein the conductive material is comprised in an amount of less than 20 wt % with respect to a total weight of the irreversible additive.

12. A positive electrode manufactured by coating the positive electrode mix according to claim 1 on an electrode collector.

13. A secondary battery comprising an electrode assembly, which comprises the positive electrode according to claim 12, a negative electrode, and a separator disposed between the positive electrode and the negative electrode, impregnated with an electrolyte solution.

14. The secondary battery according to claim 13, wherein the negative electrode comprises a silicon (Si)-based material as a negative electrode active material.

15. The secondary battery according to claim 14, wherein the negative electrode active material further comprises a carbon-based material, and the carbon-based material is comprised in an amount of 70 wt % to 99.9 wt % with respect to the total weight of the negative electrode active material.

16. The secondary battery according to claim 15, wherein the carbon-based material is at least one selected from the group consisting of artificial crystalline graphite, natural crystalline graphite, amorphous hard carbon, low-crystalline soft carbon, carbon black, acetylene black, Ketjen black, Super-P, graphene and fibrous carbon.

17. The secondary battery according to claim 16, wherein the carbon-based material is artificial crystalline graphite and/or natural crystalline graphite.

18. The secondary battery according to claim 13, wherein the secondary battery is a lithium ion battery, a lithium ion polymer battery or a lithium polymer battery.

19. A battery module comprising the secondary battery according to claim 13 as a unit cell.

20. A battery pack comprising the battery module according to claim 19.

21. A device comprising the battery pack according to claim 20 as a power source.

22. The device according to claim 21, wherein the device is an electric vehicle, a hybrid electric vehicle, a plug-in hybrid electric vehicle or a system for storing power.

* * * * *